US012729101B2

(12) United States Patent
Wallner et al.

(10) Patent No.: US 12,729,101 B2
(45) Date of Patent: Sep. 8, 2026

(54) CONTROLLER FOR AN AERIAL LIFT VEHICLE

(71) Applicant: Terex South Dakota, Inc., Watertown, SD (US)

(72) Inventors: Maxwell Elliot Wallner, Bothell, WA (US); Harrison Jenkins, Bothell, WA (US); Christian Dube, Bothell, WA (US); Zachary Gilmor, Bothell, WA (US); Spencer Vickerman, Winlock, WA (US); Kishor Natarajan, Redmond, WA (US); Michael Beckman, Seattle, WA (US); Jordan Steranka, Seattle, WA (US); Robert Schoch, Boston, MA (US); Jonah S. Griffith, Seattle, WA (US); Zebrick Roach, Seattle, WA (US); Ryan Conroy, Seattle, WA (US); John Andrew Johnson, Bainbridge Island, WA (US)

(73) Assignee: Terex South Dakota, Inc., Watertown, SD (US)

( * ) Notice: Subject to any disclaimer, the term of this patent is extended or adjusted under 35 U.S.C. 154(b) by 35 days.

(21) Appl. No.: 18/533,599

(22) Filed: Dec. 8, 2023

(65) Prior Publication Data

US 2025/0187892 A1 Jun. 12, 2025

(51) Int. Cl.
*B66F 17/00* (2006.01)
*B66F 11/04* (2006.01)

(52) U.S. Cl.
CPC .......... *B66F 17/006* (2013.01); *B66F 11/042* (2013.01)

(58) Field of Classification Search
None
See application file for complete search history.

(56) References Cited

U.S. PATENT DOCUMENTS

| | | | |
|---|---|---|---|
| 5,021,917 | A | 6/1991 | Pike et al. |
| D911,359 | S | 2/2021 | Bhatia et al. |
| 10,968,089 | B2 | 4/2021 | Bhatia et al. |
| 2002/0157498 | A1 | 10/2002 | Black |
| 2002/0158518 | A1 | 10/2002 | Taylor et al. |
| 2013/0233645 | A1 | 9/2013 | Hao et al. |

(Continued)

FOREIGN PATENT DOCUMENTS

| | | |
|---|---|---|
| CN | 215187898 U | 12/2021 |
| FR | 3050193 B1 | 11/2020 |

(Continued)

OTHER PUBLICATIONS

International Search Report and Written Opinion for Application No. PT/US24/28231, dated Aug. 22, 2024 11 pages.

(Continued)

*Primary Examiner* — James M Mcpherson
(74) *Attorney, Agent, or Firm* — Brooks Kushman P.C.

(57) ABSTRACT

A controller for a lift vehicle and a lift vehicle are provided. The controller includes a first side frame and a second side frame, and a handle frame member extending transversely between the first and second side frames. The controller has an upper control housing and a lower control housing. The first and second side frames, the handle frame member, and the upper and lower control housings cooperate to define an enclosure therebetween.

18 Claims, 4 Drawing Sheets

(56) References Cited

U.S. PATENT DOCUMENTS

| | | | |
|---|---|---|---|
| 2018/0273366 A1 | 9/2018 | Wenjing et al. | |
| 2018/0362312 A1 | 12/2018 | Beji et al. | |
| 2018/0362313 A1 | 12/2018 | Bonnefoy et al. | |
| 2019/0119090 A1 | 4/2019 | Maisonnette et al. | |
| 2019/0177140 A1 | 6/2019 | Gilbride et al. | |
| 2019/0322511 A1 | 10/2019 | Penicaud et al. | |
| 2020/0317279 A1 | 10/2020 | Mastronardi et al. | |
| 2020/0317489 A1* | 10/2020 | Bhatia | B66F 13/00 |
| 2021/0060366 A1 | 3/2021 | Minnick et al. | |
| 2021/0380381 A1 | 12/2021 | Hinders et al. | |
| 2022/0063974 A1 | 3/2022 | Boireaud et al. | |
| 2022/0289543 A1 | 9/2022 | Ikarashi et al. | |
| 2025/0083939 A1 | 3/2025 | Quoniam et al. | |

FOREIGN PATENT DOCUMENTS

| | | |
|---|---|---|
| FR | 3114091 B1 | 1/2023 |
| FR | 3123907 B1 | 6/2023 |

OTHER PUBLICATIONS

AWP Controls JLG 0272778, 1001091153 Control Box fits 1230ES 1930ES 2030ES 2032ES 2630ES 2632ES 2646ES 3246ES, Sep. 3, 2020, 5 pages.

Ex Parte Quayle Office Action for Application No. 29/920,189, dated Mar. 6, 2026, 6 pages.

International Preliminary Report on Patentability for Application No. PCT/US2024/028231, dated Jun. 8, 2026, 8 pages.

* cited by examiner

CONTROLLER FOR AN AERIAL LIFT VEHICLE

TECHNICAL FIELD

Various embodiments relate to a controller, such as a controller for an aerial lift vehicle, or mobile platform.

BACKGROUND

Lift vehicles may be provided with controllers, e.g. for an operator to control the movement of one or more components of the lift vehicle. Examples of controllers for vehicles may be found in U.S. Pat. No. 10,968,089, U.S. Pat. Pub. No. 2022/0289543, French Pub. No. FR 3 123 907 B1, and French Pub. No. FR 3 114 091 B1.

SUMMARY

A controller for a lift vehicle is provided with a housing including a first side frame extending from an upper end region to a lower end region, a second side frame extending from an upper end region to a lower end region, and a handle frame member extending transversely from the upper end region of the first side frame to the upper end region of the second side frame. The housing has an upper control housing extending transversely from the upper end region of the first side frame to the upper end region of the second side frame, and spaced apart from the handle frame member. The housing has a lower control housing extending transversely from the lower end region of the first side frame to the lower end region of the second side frame. The first and second side frames, the handle frame member, and the upper and lower control housings cooperate to define an enclosure therebetween.

A controller for a lift vehicle is provided with a housing including a first side frame extending from an upper end region to a lower end region, a second side frame extending from an upper end region to a lower end region, an upper frame member extending transversely from the upper end region of the first side frame to the upper end region of the second side frame, and a lower control housing extending transversely from the lower end region of the first side frame to the lower end region of the second side frame. The first and second side frames, the upper frame member, and the lower control housing cooperate to define an enclosure therebetween. The enclosure is continuously open for access by an operator between the first and second side frames across a range of approximately 120 degrees or a range of approximately 180 degrees.

A controller for a lift vehicle is provided with a housing including at least one side frame extending from an upper end region to a lower end region, a handle frame member supported by the at least one side frame and extending transversely from the upper end region of the at least one side frame, and a control housing supported by the at least one side frame. The handle frame member extends through a balance point for the controller.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

Figure 1:
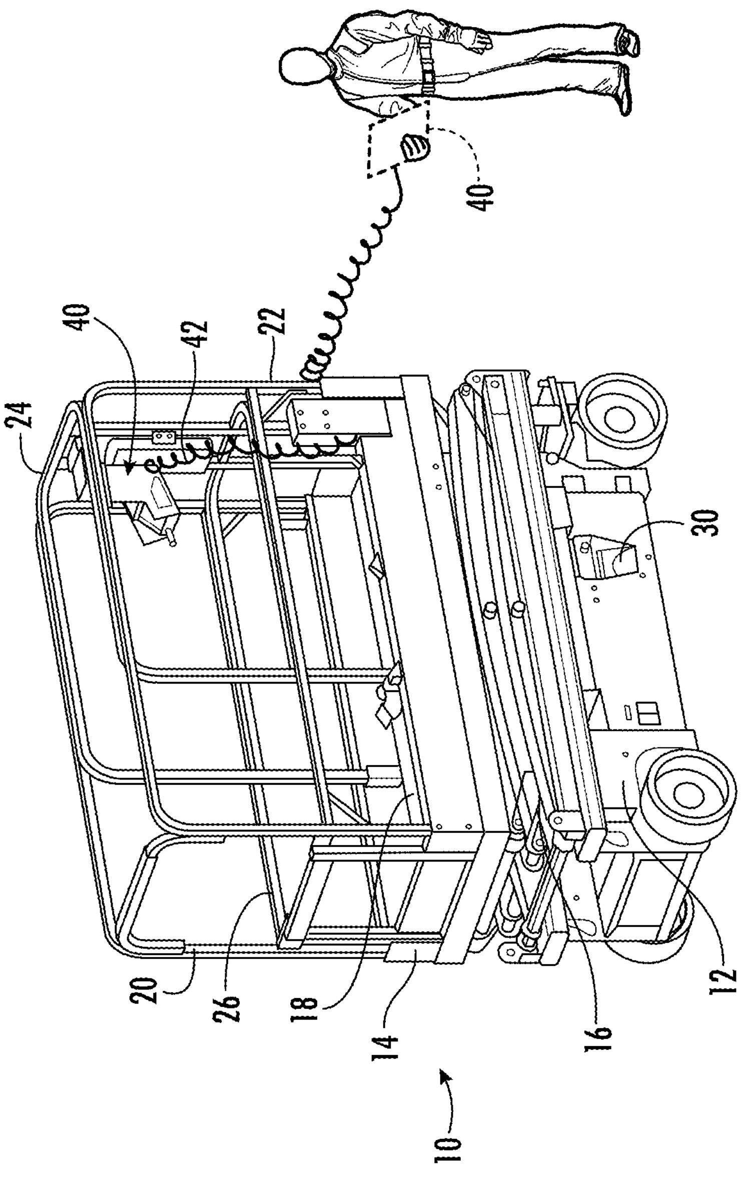
FIG. 1 is a perspective view of an aerial lift vehicle with a controller according to an embodiment.

FIG. 1 illustrates a land vehicle according to an embodiment, and depicted as an aerial lift vehicle 10 or aerial lift. The aerial lift vehicle 10 has a mobile platform 14 that may be raised or lowered relative to a chassis 12 via a lifting assembly 16 or lifting mechanism 16. The vehicle 10 is configured for lifting a load, such as a person, tools, cargo, and the like, with respect to an underlying support surface, such as paved or unpaved ground, a road, an apron such as a sidewalk or parking lot, an interior or exterior floor of a structure, or other surfaces. Traction devices, such as wheels, support the vehicle on the underlying surface.

In various examples, the vehicle 10 may be provided as a utility vehicle with a mobile work platform assembly such as an aerial work platform, a rough terrain telescopic load handler, portable material lift, telehandler, scissor lift, telescopic and articulating boom, and the like.

The mobile platform 14 includes a platform floor 18 sized to receive one or more operators or users. In some examples, the mobile platform 14 may have an extension platform or extension deck (not shown) that translates relative to the platform floor 18 to increase the floor area of the mobile platform 14, and may be extended and retracted relative to the platform floor 18.

The mobile platform 14 also includes a perimeter railing 20 or perimeter frame assembly provided around the platform floor 18. The perimeter railing 20 provides a frame of guard rails that extend around a perimeter of the platform floor 18 to contain an operator within the perimeter railing 20. A door may be provided upon the perimeter railing 20 to permit operator ingress to, and egress from, the perimeter railing 20.

The perimeter railing 20 includes a series of vertical support members 22, or upright members 22, with an upper rail 24 extending about an outer perimeter of the platform floor 18. The perimeter railing 20 additionally has an intermediate rail 26, or mid-perimeter rail, positioned between the upper rail 24 and the platform floor 18 and extending about an outer perimeter of the platform floor 18. A lower guard may additionally be provided on the mobile platform 14 as shown.

The lift vehicle 10 may be provided with one or more control inputs to the vehicle. In the example shown, the lift vehicle has a first control input or control panel 30 on the chassis 12, and another controller 40 that may be used by the operator in various locations relative to the vehicle. The controller 40 may be connected to the vehicle by a cable 42, such as a coil cable, which provides both power to the controller 40 and also acts as a data cable to transfer signals to the vehicle, and also receive signals from the vehicle (e.g. with sensor or other data). In other examples, the controller 40 may be in The controller 40 may be attached to the mobile platform, e.g. via the upper rail 24 or a mounting bracket connected to the mobile platform 14, and may be moved to various locations within the mobile platform 14, e.g. by moving the controller 40 to a different section of rail 24. The controller 40 may additionally be held or carried by an operator, either while the operator is on the mobile platform 14, or when the operator is outside the vehicle 10, as shown schematically in FIG. 1.

The controller 40 or control unit acts as a control input to the vehicle 10 for the operator to control various functions of the lift vehicle 10, including movement of the lift vehicle over underlying terrain, steering of the lift vehicle, raising and lowering of the mobile platform, control of outrigger movement, and other functions of the lift vehicle as described below. The controller 40 may additionally provide visual and/or audio alerts to the operator.

Figure 2:
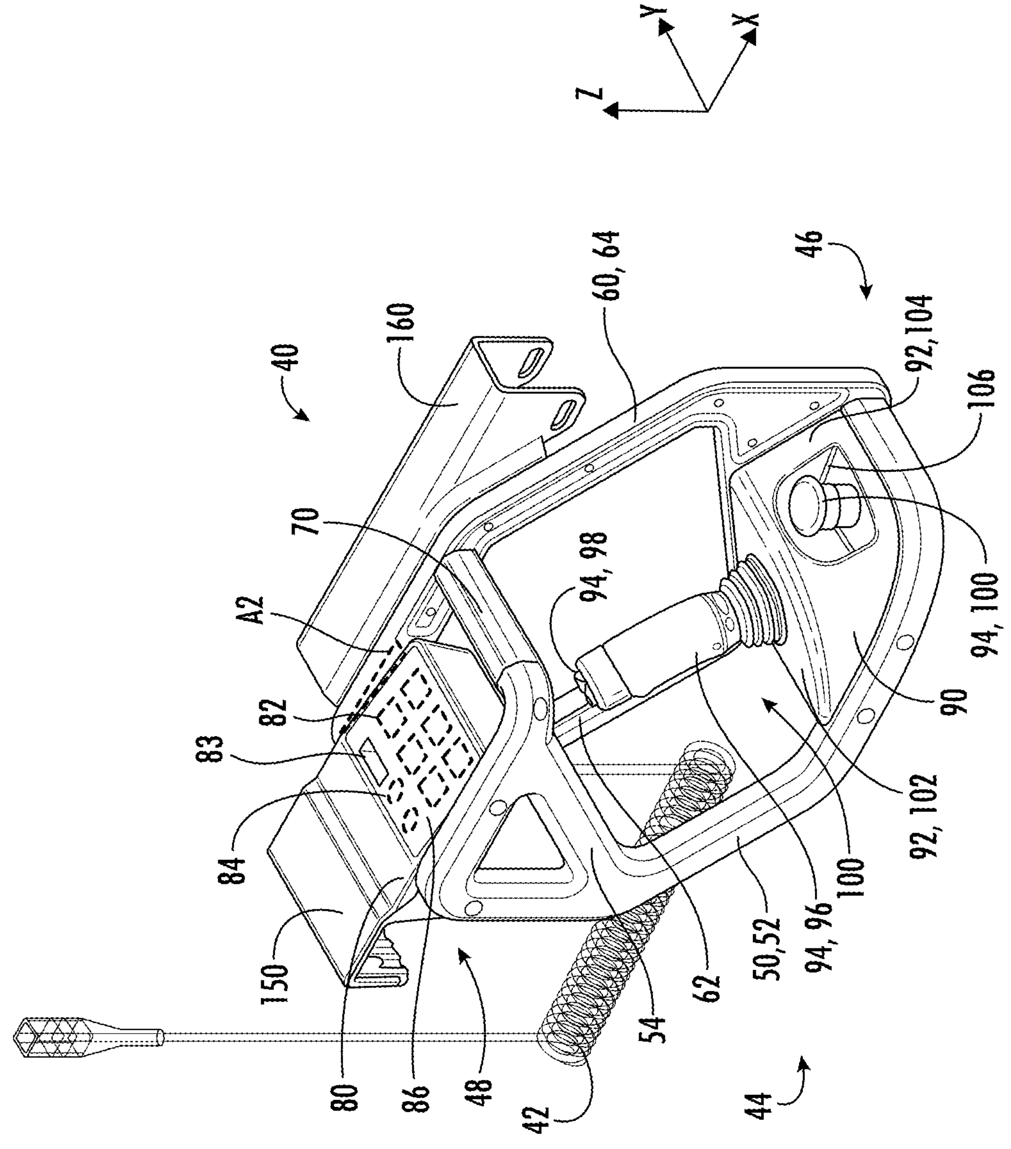
FIG. 2 is a first perspective view of a controller for use with the aerial lift vehicle of FIG. 1.
Figure 3:
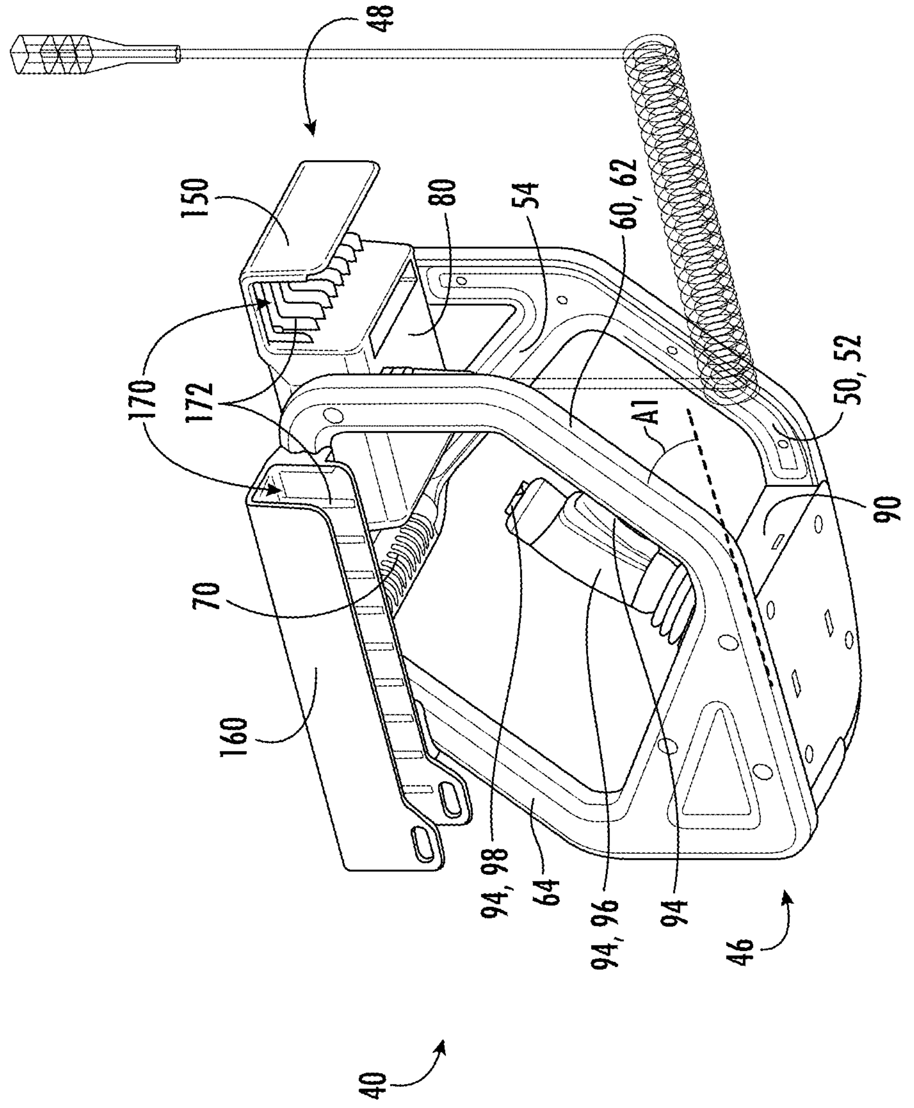
FIG. 3 is a second perspective view of the controller of FIG. 2.
Figure 4:
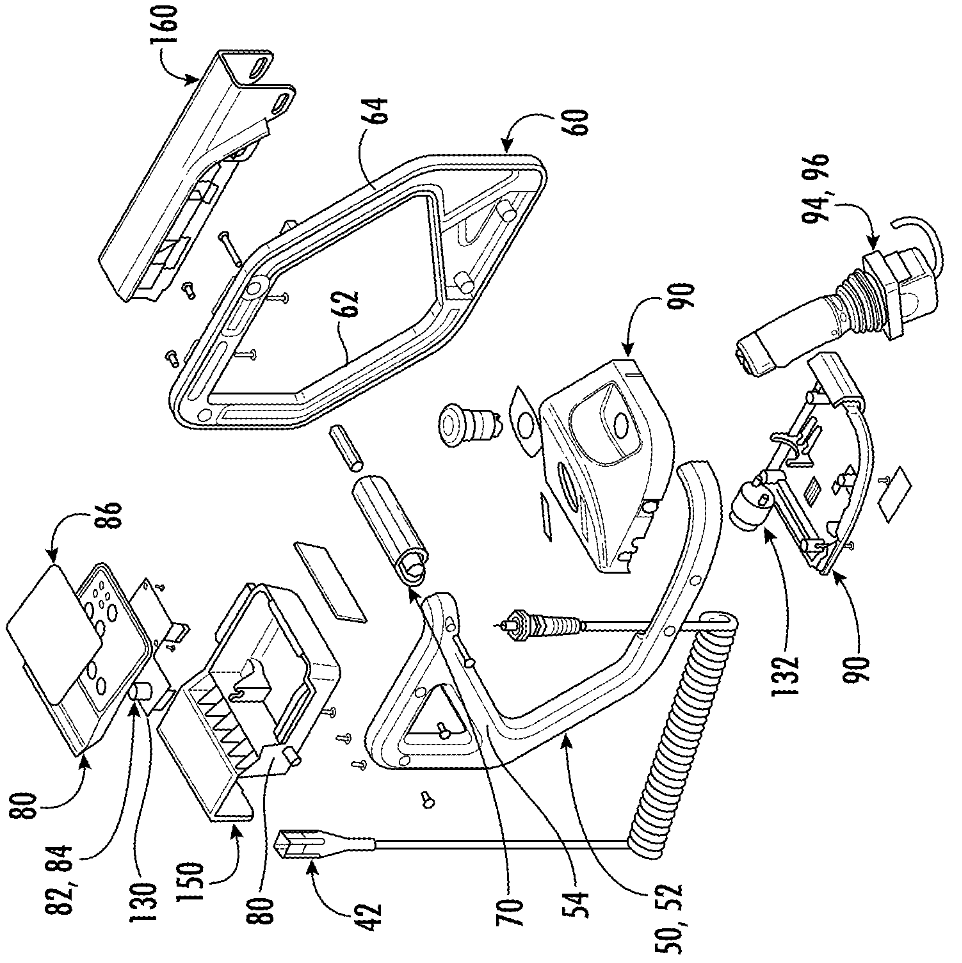
FIG. 4 is an exploded view of the controller of FIG. 2.

FIGS. 2-4 illustrate a controller 40 for use with the lift vehicle 10 according to an embodiment. The controller 40 is provided such that it may be mounted or attached to the perimeter railing 20 of the mobile platform 14 at various locations around the perimeter. The controller 40 is also provided such that it may be held by an operator in one hand, with the other hand is free to operate the control inputs for the lift vehicle 10, either with the operator in the mobile platform 14 or outside the vehicle, e.g. standing next to or walking next to the vehicle 10. The controller 40 is provided such that, when the operator is holding the controller 40 in one hand, the controller 40 is balanced and easy to move or hold, and control inputs may be operated with the other hand.

The controller 40 has a housing 44. In various examples, the housing 44 may be formed from various materials, such as plastic or metal. In the example shown, the housing 44 is formed from plastic, and is furthermore formed from multiple components that are injection molded and then connected together, e.g. via fasteners. In various examples, the housing 44 components may be provided as described below, or one or more of the components may be integrally formed.

The housing 44 has a first side frame 50 extending from an upper end region 48 to a lower end region 46. The first side frame 50 has a first side rail 52 extending from the upper end region 48 to the lower end region 46 thereof. The first side frame 50 may additionally have a connector rail 54 extending between an intermediate region of the first side rail 52 to the upper end region 48 of the first side frame 50. The housing 44 also has a second side frame 60 extending from an upper end region 48 to a lower end region 46. The second side frame 60 comprises second and third side rails 62, 64 extending from the upper end region 48 to the lower end region 46 thereof.

The housing 44 has a handle frame member 70 extending transversely from the upper end region 48 of the first side frame 50 to the upper end region 48 of the second side frame 60. In the example shown, the handle frame member 70 connects adjacent to the connector rail 54 and adjacent to the third side rail 64. The handle frame member 70 may be provided with a textured surface or with a coating to aid in operator grip on the handle frame member, and for operator comfort.

The housing 44 has an upper control housing 80 extending transversely from the upper end region 48 of the first side frame 50 to the upper end region 48 of the second side frame 60, and spaced apart from the handle frame member 70. In the example shown, the upper control housing 80 is offset behind the handle frame member 70 to provide clearance for the hand of an operator to hold the handle frame member, as well as use the handle frame member to act as a barrier to prevent or limit inadvertent actuation of any control inputs 82 on an upper surface 86 of the upper control housing, while any indicators 84 remain visible. In various examples, the operator may then hold the handle frame member 70 with one hand and additionally actuate one or more control inputs on the upper control housing 80 with a finger of the same hand.

The housing 44 has a lower control housing 90 extending transversely from the lower end region 46 of the first side frame 50 to the lower end region 46 of the second side frame 60.

The housing 44 is provided such that the first and second side frames 50, 60, the handle frame member 70, and the upper and lower control housings 80, 90 cooperate to define an enclosure 120 therebetween.

In some embodiments, and as shown, the first side rail 52 is the only side rail for the first side frame 50, such that the controller 40 only has three side rails 52, 62, 64 surrounding a perimeter of the enclosure 120. As such, the enclosure 120 may be open on two adjacent sides (e.g. the front and left side of the enclosure 120 as shown in FIG. 2 may have continuous open access (e.g. without a rail separating or dividing these sides), which may allow the operator to orient themselves at various positions relative to the controller 40 and easily access control inputs within the enclosure 120 of the controller. For example, the controller 40 allows for a wider range of movement of the arm, wrist, and hand of an operator in comparison with a controller with four rails positioned about the enclosure. In one example, and as shown, the enclosure is continuously open for access by an operator between the first and second side frames across a range of approximately 120 degrees. In other examples, the enclosure may be continuously open for access by an operator across another range, such as more than ninety degrees, 150 degrees, or 180 degrees, e.g. when the angular range is taken in a plane extending transversely to a central longitudinal axis of the joystick. Additionally, the controller 40 allows the operator to hold the controller 40 at varying angles relative to themself and to the hand used on the control inputs in the enclosure 120, providing for increased usability and comfort. In other examples, the controller may have another number of side rails, including four side rails surrounding the enclosure, or may have solid panels on one or more sides of the enclosure.

In various embodiments, and as shown herein, the controller 40 and housing 44 are provided such that the handle frame member 70 extends through a balance point for the controller 40. As such, when the operator is holding the controller 40 with one hand, the controller 40 is balanced from side-to-side, as well as from front-to-back, allowing the other hand to be free to use control inputs on the controller 40, or for other tasks unrelated to the controller 40.

The lower control housing 90 supports one or more first control inputs 94 on an upper surface 92 of the lower control housing. As such, at least some of the first control inputs 94 may extend into and be positioned within the enclosure 120, e.g. to prevent inadvertent movement or actuation of the first control inputs 94. In various examples, the first control input(s) 94 control movement of the lift vehicle over an underlying surface, and/or control the lift function. In one example, and as shown, a first input is provided by a joystick 96, where inputs to the joystick 96 from the operator control the lift vehicle 10 to move in forward and reverse, or control the lifting mechanism 16 to control the mobile platform 14 to move up or down. The first input 94 or joystick 96 may additionally control the speed of the lift vehicle, e.g. with larger movement to the joystick causing the lift vehicle to move faster. The first control input 94 may also control steering functions to control the vehicle 10 to run left or right, either via joystick 96 movement, or via switches 98 on the joystick or adjacent thereto. The first input 94 may additionally provide control over an outrigger function for the lift vehicle 10 should one be present to outriggers to extend or retract, e.g. via switches 98 on the joystick or adjacent thereto. The controller 40 may additionally be provided with a first control input 94 as a start-stop input 100, where the start-stop input 100 may be a button that is pushed to stop the vehicle 10 (e.g. stop the movement of the vehicle 10 over the underlying surface or stop the movement of the lifting assembly 16), or pulled to operate the vehicle 10.

The upper control housing 80 supports one or more second control inputs 82 and/or one or more indicators 84, e.g. on an upper surface 86 of the upper control housing. The upper surface 86 of the upper control housing may face away from the enclosure 120, and may be adjacent to the upper plane of the controller such that the second control inputs 82 are accessible from the top of the controller 40 by an operator.

The second control inputs 82 may include one or more buttons and/or switches to control other functions of the lift vehicle 10, such as to select various operating modes for the lift vehicle, e.g. slow versus fast drive speed mode, indoor versus outdoor use modes, and the like. In various examples, the second control inputs 82 may be provided as a part of a flat button panel array, e.g. as membrane switches, or the like.

The second control housing 80 may further include a display screen 83, indicator lights 84 (including solid lights and/or symbols), or the like to provide information to the operator regarding the state of the vehicle, including the current operating state, battery state, outrigger state, as well as any visual alerts.

The upper control housing 80 or the lower control housing 90 may additionally support a control unit 130, such as a printed circuit board control unit, in communication with the first and second control inputs 94, 82, and the cable 42. In the example shown, the control unit 130 is provided within the upper control housing 80. The lower control housing 90 also supports an audible alarm unit 132, such as a speaker, and in other examples, the audible alarm unit may be provided within the upper control housing 80.

The controller 40 has one or more hanging brackets. In the example shown, the controller 40 has a first hanging bracket 150 and a second hanging bracket 160. The hanging brackets 150, 160 may be used to support and attach the controller 40 to the perimeter railing 20 of the mobile platform 14. In the example shown, the first and second hanging brackets 150, 160 each define a channel 170 sized to receive a section of the perimeter railing 20. Furthermore, the channels 170 of the hanging brackets may include protrusions 172 or other features, such as a non-skid coating, to engage the perimeter railing 20 and better retain the controller 40 thereto. In other examples, the hanging brackets 150, 160 may be otherwise provided, e.g. to mate and cooperate with another mounting bracket on the lift vehicle 10.

The first hanging bracket 150 extends outwardly from the controller housing 44 adjacent to the upper end regions 48 of the first and second side frames 50, 60 such that the upper control housing 80 is positioned between the handle frame member 70 and the first hanging bracket 150. In the example shown, the first hanging bracket 150 is integrally formed with the upper control housing 80. In other examples, the first hanging bracket 150 may be separate from and mounted to the upper control housing 80, and/or the first and second side frames 50, 60.

The second hanging bracket 160 extends outwardly from the controller housing 44 adjacent to the upper end region 48 of the second side frame 60 such that the second side frame 60 is positioned between the second hanging bracket 160 and the handle frame member 70.

As shown, the first and second hanging brackets 150, 160 lie and extend in an upper plane for the controller, e.g. an X-Y plane. The handle frame member 70 may additionally lie and extend within the upper plane. The lower surface of the lower control housing 90, as well as the lower end regions 46 of the first and second side frames 50, 60 may additionally lie and extend in a lower plane for the controller 40, e.g. another X-Y plane that is parallel to the upper plane. In the example shown, the upper control housing 80 is offset from the lower control housing 90 such that each of the first, second, and third side rails 52, 62, 64 extend rearwardly towards the upper plane and are oriented at an acute angle A1 relative to the lower plane, and likewise, at an acute angle relative to the upper plane.

In the example shown, the first hanging bracket 150 extends perpendicularly to the second hanging bracket 160, such that the hanging brackets 150, 160 can be used to attach the controller 40 into a corner region of the perimeter railing 20. As shown, the first hanging bracket 150 is offset from the second hanging bracket 160 such that only the first hanging bracket 150 or the second hanging bracket 160 could be used to attach the controller 40 along a single straight section of the perimeter railing 20.

The upper surface 86 of the upper control housing 80 may be offset below the upper plane of the controller 40, and additionally may be angled towards the handle frame member 70, e.g. oriented at an acute angle A2 relative to the upper plane.

The upper surface 92 of the lower control housing 90 may define a first region 102 and a second region 104. The first region 102 supports the joystick 96 of the first control inputs 94, and is generally positioned beneath the handle frame member 70. The first region 102 is oriented at an acute angle A3 relative to the upper plane, and likewise is oriented at an acute angle relative to the lower plane, and the joystick 96 may be mounted to be perpendicular to the first region 102. The second region 104 is positioned adjacent to and in front of the first region 102, and defines a recess 106. Another first control input 94, such as the start-stop button 100, may be positioned within the recess 106, and furthermore, may protrude out of the recess 106 and above the surface of the second region 104.

In various embodiments, and as shown, the first region 102 and a longitudinal axis of the connector rail 54 may be generally parallel to one another. The first, second, and third rails 52, 62, 64 extend generally parallel to one another, and may be generally perpendicular to the first region 102 of the lower control housing 90.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A controller for a lift vehicle, the controller comprising:
a housing comprising:
a first side frame extending from an upper end region to a lower end region,
a second side frame extending from an upper end region to a lower end region,
a handle frame member extending transversely from the upper end region of the first side frame to the upper end region of the second side frame,
an upper control housing extending transversely from the upper end region of the first side frame to the upper end region of the second side frame, and spaced apart from the handle frame member such that a space is defined between the upper control housing and the handle frame member, wherein the space extends between the first and second side frames, and
a lower control housing extending transversely from the lower end region of the first side frame to the lower end region of the second side frame;
wherein the first and second side frames, the handle frame member, and the upper and lower control housings cooperate to define an enclosure therebetween.

2. The controller of claim 1 wherein the handle frame member extends through a balance point for the controller.

3. The controller of claim 1 further comprising one or more first control inputs supported by the lower control housing and extending into the enclosure.

4. The controller of claim 3 wherein the first control input comprises a joystick to control a drive function and/or a lift function of the lift vehicle.

5. The controller of claim 3 further comprising one or more second control inputs supported by an upper surface of the upper control housing.

6. The controller of claim 5 wherein the second control input comprises a button and/or a switch.

7. The controller of claim 3 further comprising one or more indicators supported by an upper surface of the upper control housing.

8. A controller for a lift vehicle, the controller comprising:
a housing comprising:
a first side frame extending from an upper end region to a lower end region,
a second side frame extending from an upper end region to a lower end region,
a handle frame member extending transversely from the upper end region of the first side frame to the upper end region of the second side frame,
an upper control housing extending transversely from the upper end region of the first side frame to the upper end region of the second side frame, and spaced apart from the handle frame member, and
a lower control housing extending transversely from the lower end region of the first side frame to the lower end region of the second side frame; and
a first hanging bracket extending outwardly from the housing adjacent to the upper end regions of the first and second side frames such that the upper control housing is positioned between the handle frame member and the first hanging bracket, the first hanging bracket sized to receive a perimeter rail;
wherein the first and second side frames, the handle frame member, and the upper and lower control housings cooperate to define an enclosure therebetween.

9. The controller of claim 8 further comprising a second hanging bracket extending outwardly from the controller housing adjacent to the upper end region of the second side frame such that the second side frame is positioned between the second hanging bracket and the handle frame member, the second hanging bracket sized to receive the perimeter rail.

10. The controller of claim 9 wherein the first hanging bracket extends perpendicularly to the second hanging bracket.

11. The controller of claim 9 wherein the first and second hanging brackets and the handle frame member extend in an upper plane for the controller.

12. The controller of claim 11 wherein the lower control housing defines an upper surface having a first region positioned an acute angle relative to the upper plane, the first region positioned beneath the handle frame member; and
wherein the controller further comprises a first control input extending outwardly from the first region of the upper surface.

13. The controller of claim 12 wherein the upper surface of the lower control housing defines a second region adjacent to the first region, the second region defining a recess; and
wherein the controller further comprises another first control input positioned within the recess.

14. A controller for a lift vehicle, the controller comprising:
a housing comprising:
a first side frame extending from an upper end region to a lower end region,
a second side frame extending from an upper end region to a lower end region,
a handle frame member extending transversely from the upper end region of the first side frame to the upper end region of the second side frame,
an upper control housing extending transversely from the upper end region of the first side frame to the upper end region of the second side frame, and spaced apart from the handle frame member, and
a lower control housing extending transversely from the lower end region of the first side frame to the lower end region of the second side frame;
wherein the first and second side frames, the handle frame member, and the upper and lower control housings cooperate to define an enclosure therebetween,
wherein the first side frame comprises a first side rail extending from the upper end region to the lower end region thereof, wherein the first side rail is the only side rail for the first side frame; and
wherein the second side frame comprises second and third side rails extending from the upper end region to the lower end region thereof.

15. The controller of claim 14 wherein the upper control housing is offset from the lower control housing such that each of the first, second, and third side rails are oriented at an acute angle relative to an upper transverse plane of the controller.

16. A lift vehicle comprising:
a chassis;
a lifting assembly supported by the chassis;

a mobile platform supported by the lifting assembly, wherein the lifting assembly moves a position of the mobile platform relative to the chassis; and a controller according to claim 1.

17. The lift vehicle according to claim 16 wherein the controller is connected to the mobile platform via a cable.

18. The controller of claim 1 wherein the upper control housing is offset behind the handle frame member to provide clearance for a hand of an operator to extend therebetween to hold the handle frame member.

* * * * *